United States Patent
Kuwabara

(10) Patent No.: US 8,678,152 B2
(45) Date of Patent: Mar. 25, 2014

(54) ELECTROMAGNETIC CLUTCH WITH BRAKE

(75) Inventor: Hideaki Kuwabara, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 346 days.

(21) Appl. No.: 13/122,082

(22) PCT Filed: Oct. 6, 2009

(86) PCT No.: PCT/JP2009/067373
§ 371 (c)(1),
(2), (4) Date: Mar. 31, 2011

(87) PCT Pub. No.: WO2010/041638
PCT Pub. Date: Apr. 15, 2010

(65) Prior Publication Data
US 2011/0259703 A1    Oct. 27, 2011

(30) Foreign Application Priority Data
Oct. 6, 2008 (JP) .................................. 2008-259513

(51) Int. Cl.
  *B60W 10/02* (2006.01)
  *F16D 67/06* (2006.01)
  *F16D 11/06* (2006.01)

(52) U.S. Cl.
  USPC ........................ 192/18 B; 192/84.961; 188/83

(58) Field of Classification Search
  USPC ............................... 192/84.961, 18 B; 188/83
  See application file for complete search history.

(56) References Cited

FOREIGN PATENT DOCUMENTS

| CN | 2113377 U | 8/1992 |
|---|---|---|
| JP | 60 35921 | 3/1985 |
| JP | 60 35922 | 3/1985 |
| JP | H08145096 | * 6/1996 |
| JP | 2000320590 | * 11/2000 |
| JP | 3291908 | 6/2002 |

OTHER PUBLICATIONS

International Search Report issued Nov. 24, 2009 in PCT/JP09/067373 filed Oct. 6, 2009.
Combined Chinese Office Action and Search Report issued Jun. 25, 2013 in Patent Application No. 200980138503.2.

* cited by examiner

*Primary Examiner* — David D Le
*Assistant Examiner* — Colby M Hansen
(74) *Attorney, Agent, or Firm* — Oblon, Spivak, McClelland, Maier & Neustadt, L.L.P.

(57) ABSTRACT

An electromagnetic clutch with a brake has a novel function which, after the electromagnetic clutch is disengaged, accurately prevents co-rotation of a driven shaft to improve response when the brake is activated. Brake means (9) is configured such that a facing (93) is constantly made to slide on a brake friction surface (5d) of a rotor by a spring (92) having a base end supported by a field (8) through an arm (7). The magnitude of brake torque (Tb) caused by the brake means (9) is set to be not less than slide torque (Ta) between a driven shaft (2) and a drive shaft (1) and less than driving torque (Tc) by the drive shaft (1).

7 Claims, 3 Drawing Sheets

US 8,678,152 B2

ELECTROMAGNETIC CLUTCH WITH BRAKE

TECHNICAL FIELD

The present invention relates to an electromagnetic clutch with a brake which is used for paper feeding in a copying machine, a printer or the like, particularly to an electromagnetic clutch with a brake which is enhanced in response performance of the brake.

BACKGROUND ART

As an electromagnetic clutch with a brake of this kind, there has been known, for example, one that is shown in FIG. 1 of Patent Document 1.

This electromagnetic clutch includes: a drive shaft; a driven shaft located concentrically with the drive shaft; a rotor which is integrally fixed to the driven shaft, and which has a clutch friction surface at a side surface on one side and a brake friction surface at a side surface on the other side; a magnetic pole body which has a coil and a coil bobbin for holding the coil, forms a magnetic circuit for a magnetic flux generated by excitation of the coil, and is fixed to a stationary member; a clutch armature which is so fixed as to be displaceable only in the axial direction relative to the drive shaft, is located opposite to the rotor, and is pressed against the clutch friction surface of the rotor by a magnetic attractive force generated by excitation of the coil; a brake armature which has a friction surface opposed to the brake friction surface of the rotor, and releases a braking action on the rotor by the magnetic attractive force generated by excitation of the coil; means for supporting the brake armature so as to be displaceable only in the axial direction in the magnetic pole body; and elastic means for causing the brake armature to give a braking action on the rotor only when the coil is not excited. The driven shaft in this case is assumed to be connected to a shaft in an applied apparatus such as a copying machine.

The brake function is added to the electromagnetic clutch used for paper feeding in a copying machine, a printer or the like, for the following reason. This kind of electromagnetic clutch is attached to a paper-feeding roller, and, when required, the clutch is engaged to effect paper feeding. Recently, the quality of papers to be used has been diversified. Especially where thick papers are used, a paper misfeeding may be generated in which paper is fed due to a flexure pressure, notwithstanding the clutch is disengaged. It is said that the brake function is added to the electromagnetic clutch in order to obviate such an error.

Incidentally, the electromagnetic clutch with the brake shown in Patent Document 1 operates as follows. When the coil is energized, a magnetic circuit due to a magnetic flux is formed which passes through the clutch armature, the rotor, the brake armature, the magnetic pole body, and the driven shaft, whereby the clutch armature is attracted onto the rotor. As a result, the torque of the drive shaft is transmitted through the clutch armature and the rotor to the driven shaft, and required driving such as paper feeding for the applied apparatus (not shown) is effected through the driven shaft. In this case, the brake armature is attracted onto the magnetic pole body against the springy pressure of the elastic means, so that the braking action on the driven shaft is being cleared. Next, when the energization of the coil is stopped, the clutch armature is released from the attraction onto the rotor, so that the rotor and, hence, the driven shaft will lose the drive force. Further, the brake armature is pressed against the rotor by the springy pressure of the elastic means and, therefore, a required braking force is applied to the driven shaft. In this manner, a measure for early stopping of the driven shaft attendant on de-energization is contrived.

PRIOR ART DOCUMENT

Patent Document

Patent Document 1: Japanese Patent No. 3291908

SUMMARY OF INVENTION

Technical Problem

However, when the brake armature is excitedly actuated together with the clutch armature so as to apply brake in the configuration wherein a drive shaft is disposed coaxially and slidably on the outer periphery of a driven shaft as in Patent Document 1, a time lag is generated after the de-energization of the coil and before braking is started as a result of the movement of the brake armature to the brake friction surface of the rotor under the biasing by the spring due to the release attendant on the de-energization. During this time lag, part of torque is kept transmitting from the drive shaft to the driven shaft through the sliding part, and, where this part of torque is greater than the load torque acting on the driven shaft, co-rotation of the driven shaft occurs. Therefore, it is difficult to meet such demands as a demand for stopping the rotor speedily, as compared with the above-mentioned time lag.

The present invention has been made paying attention to the above-mentioned problem. Accordingly, it is an object of the present invention to provide an electromagnetic clutch with a brake which, in addition to a function of simply braking a rotor, has a novel function of accurately preventing co-rotation of a driven shaft after disengagement of the electromagnetic clutch, thereby effectively improving response upon activation of the brake.

Technical Solution

The present invention, in order to attain the above object, provides the following means.

According to the present invention, there is provided an electromagnetic clutch with a brake, including: a driven shaft; a drive shaft disposed coaxially and slidably on the outer periphery of the driven shaft; a rotor rotatable together with the driven shaft and having a clutch friction surface at least at an end surface on one side in the axial direction; an armature fixed to the drive shaft so as to be displaceable in the axial direction and, in this state, disposed opposite to the rotor; excitation means which has at least a coil on a stationary member side for supporting rotation of the driven shaft and the rotor and which, when the coil is excited, attracts the armature to press the armature against the clutch friction surface of the rotor and which, when electric power supply is stopped, releases the armature from the rotor; and brake means which is provided between a part on the stationary member side and the rotor, the driven shaft or a part on a rotating member side rotated together with the rotor and the driven shaft and by which brake is constantly applied to the rotating member side from the stationary member side; wherein the magnitude of brake torque by the brake means is set to be not less than slide torque between the driven shaft and the drive shaft and less than drive torque by the drive shaft.

This configuration ensures that co-rotation of the rotating member side inclusive of the shaft and the rotor due to the sliding contact as above-mentioned can be prevented effectively. In addition, an effective braking action is attained simultaneously with the stop of electric power supply. Therefore, the time lag from the moment of release due to de-energization to the moment of making sliding contact with the brake friction surface, as experienced in the case of the conventional brake armature, can be eliminated, and response at the time of the stop can be enhanced effectively.

The brake means in this case is not restricted in regard of the place where it is configured, etc. insofar as it can apply a braking torque on the rotating member side while using the stationary member side as a scaffold or support base. Preferable modes include a configuration in which a brake friction surface is provided at an end surface on the other side of the rotor, and the brake means brings a brake element into elastic contact with the brake friction surface from the stationary member side.

In a configuration, in order to form a magnetic circuit passing through the rotor and the armature, a magnetic circuit forming member on the stationary member side is disposed on the outer circumference side of the coil, and the rotor is disposed around the outer periphery of the magnetic circuit forming member so as to partly cover the latter. In this configuration, in order to enable easy substitution for the conventional excitation type brake mechanism, preferably, the base end of a spring is supported on the magnetic circuit forming member or the stationary member side in the vicinity of the magnetic circuit forming member either directly or through a support member, and a brake element set on the tip end side of the spring is put in sliding contact with the brake friction surface of the rotor, thereby constituting the brake means.

The brake element may be the tip end of the spring itself, or may be a brake member such as a facing which is attached to the tip end of the spring.

In order to prevent co-rotation between a part of the spring or the brake element and a part of the support member or the magnetic circuit forming member and thereby to contrive putting the present invention into effect, it is desirable to provide, between these components, restriction means which permits relative displacements in the axial direction but restrains relative displacements in the rotating direction, of a part of the spring or the brake element.

Effect of the Invention

The present invention is constituted as above. According to the invention, therefore, it is possible to provide an electromagnetic clutch with a brake which, in addition to simply braking a rotor, is able to accurately prevent co-rotation of a driven shaft after disengagement of the electromagnetic clutch, thereby effectively improving response upon activation of the brake, is able to speedily stop a load connected to the driven shaft in response to stop of electric power supply, and is therefore excellent in stopping performance.

MODE FOR CARRYING OUT THE INVENTION

Now, an embodiment of the present invention will be described below referring the drawings.

Figure 1:
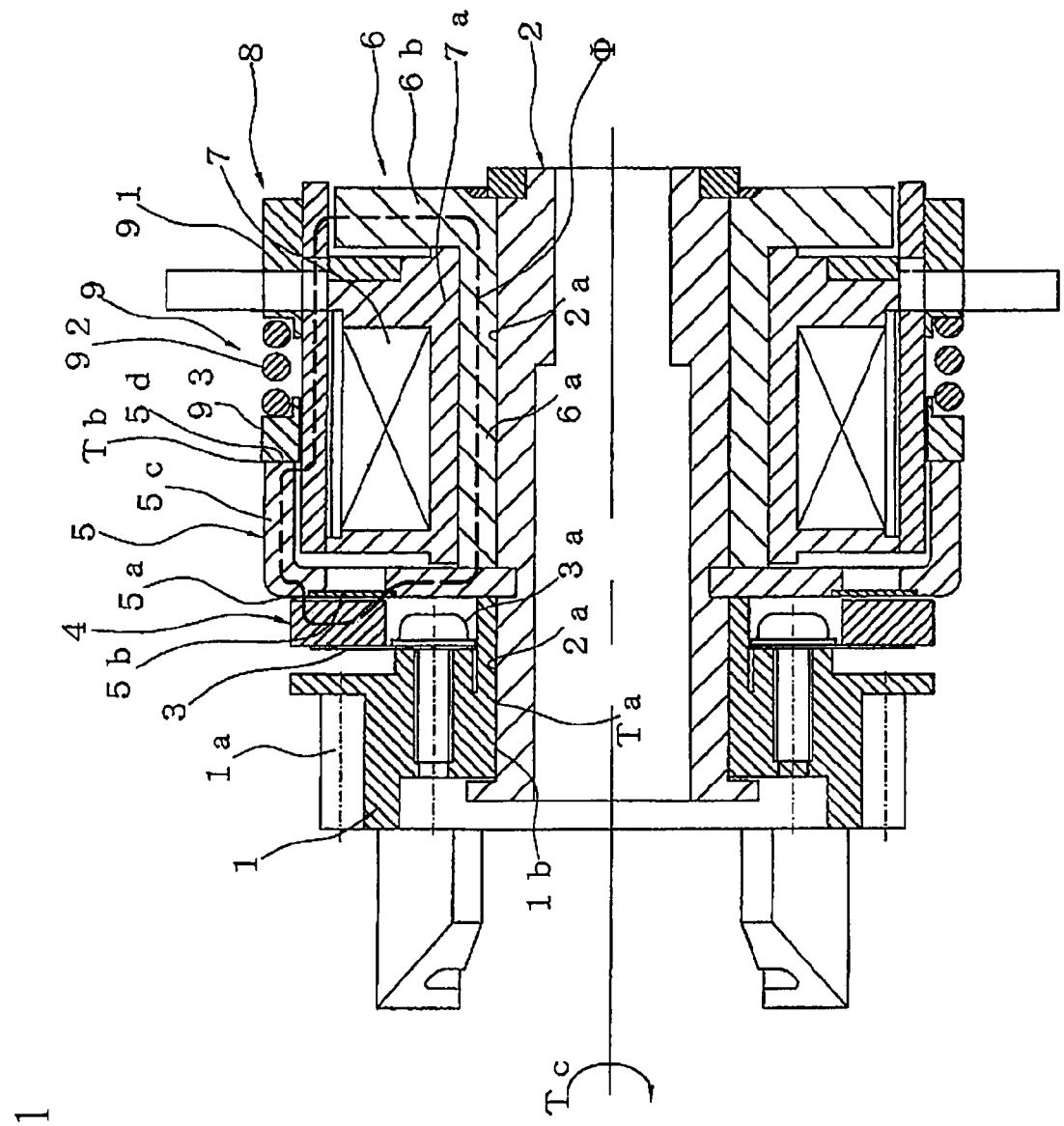
FIG. 1 A general sectional view showing an embodiment of the present invention.

An electromagnetic clutch with a brake shown in FIG. 1 is of a micro-clutch type, having a clutch function by which elastic contact between a drive shaft 1 and a shaft 2 serving as a driven shaft can be switched and a brake function by which the shaft 2 is stopped when the clutch is disengaged.

The drive shaft 1 is hollow. For example, for playing the role of a secondary-side gear receiving power through meshing with a primary-side gear connected to a motor (not shown), the drive shaft 1 is provided at its outer periphery with gear teeth 1a, and has an inner periphery 1b slidably fitted onto an outer periphery 2a of the shaft 2. A leaf spring 3 is attached to an end face of the drive shaft 1 through a bolt 3a so as to be rotatable together with the drive shaft 1. An armature 4 is fixed to one surface on the outer periphery side of the leaf spring 3, in the state of being displaceable in the axial direction by elasticity of the leaf spring 3.

On the other hand, adjacently to the armature 4, a rotor 5 is mounted to the outer periphery of the shaft 2 so as to be rotatable together with the shaft 2. The rotor 5 is in the shape of a bottomed tube. Of the rotor 5, one end face 5a located on the bottom portion side is opposed to the armature 4, and a clutch friction surface 5b is set at a part thereof. A tubular part 5c of the rotor 5 is disposed around the outer periphery of the shaft 2, with a required space left therebetween. The rotor 5 plays a role by which rotational torque received from the armature 4 is transmitted to the shaft 2 and which constitute a part of magnetic circuit forming members on the rotating member side.

A hub rotor 6, a field 7 and a coil 8 are disposed to be located in the above-mentioned space.

The hub rotor 6, which constitutes a part of the magnetic circuit forming members on the rotating member side, has a boss part 6a disposed on the outer periphery 2a of the shaft 2, and a base end 6b spread from the base end of the boss part 6a in the directions for closing the above-mentioned space. The hub rotor 6 is fixed to the shaft 2 so as to be rotatable together.

A wiring (not shown) is led into the coil 7 through a part of the field 8 so that the coil 7 can be supplied with electric power, together with a motor (not shown).

The field 8, which is a hollow cylindrical member disposed on the outer periphery side of the coil 7, supports a coil bobbin 7a with the coil 7 wound thereon, and constitutes a magnetic circuit forming member on the stationary member side. The tubular part 5c of the rotor is disposed on the outside of the field 7 in the manner of covering the latter.

Specifically, the coil 7 and the leaf spring 3 constitute the excitation means in the present invention. When the coil 7 is excited simultaneously with power supply to the external motor, a magnetic circuit due to a magnetic flux Φ as indicated by broken line in the figure is formed along the field 8, the rotor 5, the armature 4, and the hub rotor 6, whereby the armature 4 is attracted and pressed against the clutch friction surface 5b of the rotor 5. As a result, motive power of the drive shaft 1 is transmitted through the leaf spring 3, the armature 4 and the rotor 5 to the shaft 2. Consequently, load driving such as paper feeding in, for example, an applied apparatus (not shown) connected to the shaft 2 is effected. When the attraction of the armature 4 onto the rotor 5 is released, the armature 4 is separated from the rotor 5 by the action of the leaf spring 3.

Incidentally, the stationary member side in the present invention includes the coil 7, the coil bobbin 7a holding the coil 7 in the wound state, the field 8 and the like, whereas the rotating member side includes the drive shaft 1, the driven shaft (shaft) 2, the armature 4, the rotor 5, and the hub rotor 6.

In this embodiment, besides, the other end face 5d of the rotor 5 is set as a brake friction surface, and brake means 9 in the present invention is configured at a position opposed to the brake friction surface 5d.

The brake means 9 includes a coil spring 92 which has a base end supported on the field 8 through an arm 91 serving as a support member, and a facing 93 as a brake element which is provided at a tip end of the coil spring 92. It is realized by the brake means 9 that the facing 93 is constantly kept in sliding contact with the brake frictional surface 5d of the rotor 5 by the coil spring 92. The facing 93 has a required coefficient of friction on its surface on the side of facing the brake friction surface 5d of the rotor 5, and is formed from a material that is not influenced by magnetic flux. Therefore, the facing 93 would not be actuated attendant on variations in magnetic flux.

Figure 2:
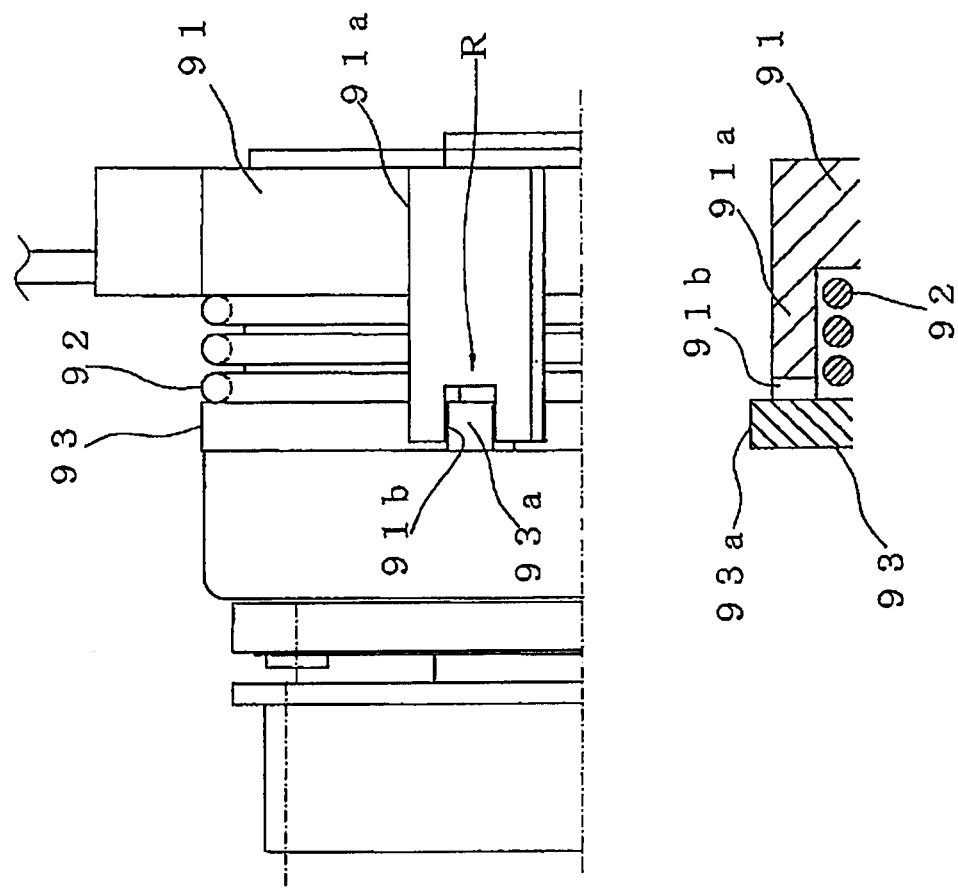
FIG. 2 A view showing appearance of a part of FIG. 1, etc.
Figure 3:
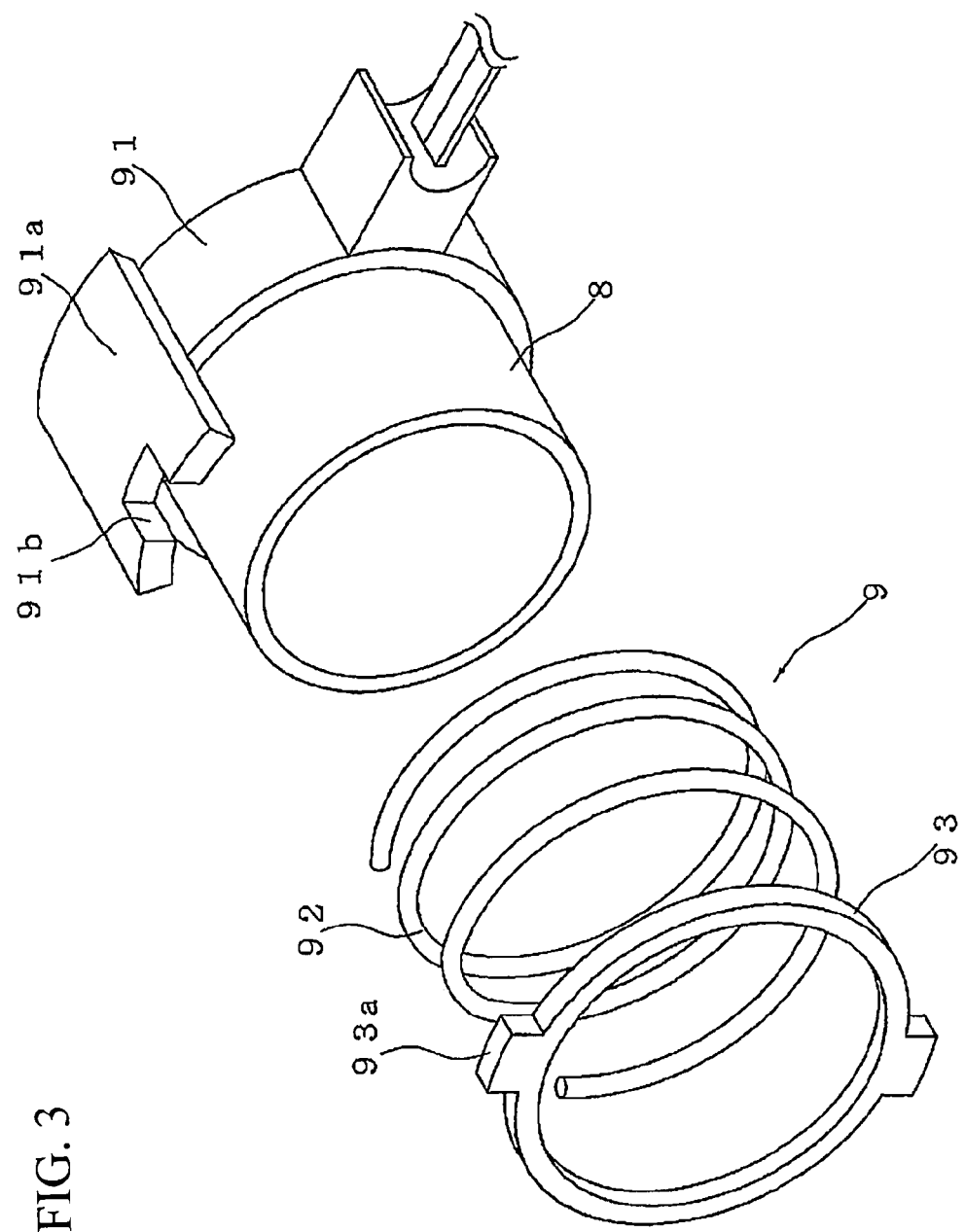
FIG. 3 An exploded perspective view of a major part, showing the configuration in the vicinity of brake means in the embodiment.

Besides, in this embodiment, between the facing 93 and the arm 91, there is provided restriction means R which permits relative displacements in the axial direction but restrains relative displacements in the rotating direction, of the facing 93 relative to the arm 91. In the restriction means 10, as shown in FIGS. 2 and 3, the arm 91 is provided at a part thereof with an extension part 91a extending in the axial direction in an eaves-like manner, and the extension part 91a is provided with a guide groove 91b. On the other hand, the facing 93 is provided at a part thereof with a projection 93a projecting from the outer circumference thereof, and the projection part 93a is slidably engaged with the guide groove 91b. The arm 91 has both the function as anti-rotation means for the facing 93 and the function as a base end side support for the spring 92. If a part of the field 8 has a form corresponding to these functions of the arm 91, however, the arm 91 is unnecessary.

The magnitude of brake torque Tb by the brake means 9 is set to be not less than slide torque Ta between the shaft 2 and the drive shaft 1 shown in FIG. 1 and to be less than drive torque Tc by the drive shaft 1. In this case, the brake torque Tb is a braking torque generated from the frictional contact of the facing 93 with the brake-side friction surface 5d of the rotor 5 effected by the spring 92; the slide torque Ta is an idling torque on the drive shaft 1 side (clutch rotation side) when the clutch is disengaged; and the drive torque Tc is a rotational torque transmitted from the exterior to the drive shaft 1 side (clutch rotation side) when the clutch is engaged.

Where the brake means 9 as above is configured as a part of an electromagnetic clutch with a brake, it is ensured, since the brake torque Tb is not less than the slide torque Ta between the shaft 2 and the drive shaft 1, that after the clutch is disengaged due to stop of power supply, the shaft 2 is braked reliably and co-rotation of the shaft 2 at the portion of sliding contact with the drive shaft 1 can be prevented effectively. Besides, the brake means 9 is constantly braking the rotor 5, and an effective braking action is attained simultaneously with the stop of power supply. Therefore, there is no risk of the time-lag problem experienced in the conventional brake mechanism wherein a time lag exists from the moment of release due to de-excitation attendant on the stop of power supply to the moment when an armature moves to reach a brake friction surface and effective braking is thereby started. Thus, the shaft 2 can be stopped swiftly, not only in the situations where the load connected to the driven shaft is light or absent but also in the case where the load (and, hence, inertia after the stop of power supply) is somewhat high. Accordingly, it is possible to effectively meet such needs as a need for stopping the shaft 2 during the time lag experienced in the conventional system. Notwithstanding such a configuration as above-described, it is normally unnecessary to set the brake torque Tb at such a high value as to conspicuously spoil the efficiency of power transmission from the drive shaft 1 to the shaft 2. Accordingly, the brake torque Tb can be easily configured within such a range as not to produce any special problem on an operation basis, and electric power consumption and the like can be suppressed to negligible ranges.

In a specific configuration, the rotor 5 is provided with the brake friction surface 5d at its other end face where to receive the drive from the drive shaft 1 side through the armature 4, and the brake means 9 brings the facing 93 as a brake element into elastic contact with the brake friction surface 5d from the stationary member side. Therefore, the power transmission when the clutch is engaged and the braking action when the clutch is disengaged can be performed through the rotor 5 serving as a common member. Accordingly, it is possible to obtain the effects on a reduction in size and a reduction in the number of component parts, like in Patent Document 1.

More specifically, a configuration equivalent or similar to that in Patent Document 1 is adopted in that in order to form a magnetic circuit Φ passing through the rotor 5 and the armature 4, the field 8 as a magnetic circuit forming member is disposed on the outer periphery side of the coil 7, and the rotor 5 is disposed around the outer periphery of the field 8 in the manner of covering a part of the latter. While adopting this configuration, the base end of the spring 92 is supported on the field 8 through the arm 91, and the facing 93 as the brake element provided on the tip end side of the spring 92 is kept in elastic contact with the brake friction surface 5d of the rotor 5, thereby configuring the brake means 9. Therefore, it suffices to support the spring 92 and the facing 93 on the field 8 either directly or through the arm 91. Thus, the brake means 9 can be easily configured by only external arrangements. Moreover, in this brake means 9, the brake torque is exerted on the rotor 5 on the outer circumference side, and, therefore, a torque arm can be secured sufficiently.

Besides, since it suffices to attach the facing 93 as the brake element to the tip end of the spring 92, an extremely simple configuration is ensured.

In this case, between the facing 93 as the brake element and the arm 91 attached to the field 8, there is provided the restriction means 9 for permitting relative displacements in the axial direction but restraining relative displacement in the rotating direction. Therefore, prevention of co-rotation can be reliably prevented, also between the brake friction surface 5d and the rotor 5 and the facing 5 serving as the brake element. Consequently, the braking action in the present invention can be exhibited effectively.

Incidentally, the specific configurations of the parts or sections are not limited to those in the above-described embodiment.

For instance, the brake means is not limited to the above-mentioned installation place, insofar as a brake torque can be exerted on the rotating member side while using the stationary member side as a scaffold. For example, a configuration may be adopted in which the brake means is disposed, for example, between the coil bobbin on which the coil is wound and the brake hub. It is to be noted here, however, that the above-described embodiment is more effective in that the brake means can be configured on the more outer circumference side and that a larger torque arm can be attained thereby.

In addition, a leaf spring may be adopted in place of the coil spring. In the case where a leaf spring is adopted, its high torsional rigidity ensures that the leaf spring itself may directly be put in sliding contact with the brake friction surface of the rotor (in other words, the facing itself may be formed in the shape of a leaf spring), if a required coefficient of friction can be secured at the tip end thereof. In this case, the present invention can be constituted by only adding one component part, and the configuration of the restriction means for restraining the displacements in the rotating direction becomes unnecessary if the base end of the spring and the magnetic circuit forming member or a support member can be fixed.

Further, the restriction means is not limited to the above-mentioned structure, insofar as the brake element can be held in a predetermined rotational phase position against the braking torque.

In addition, if the elasticity of the spring is appropriate, the same operational advantage as that of the present invention can be realized by only substituting a non-magnetic material for the armature set in sliding contact with the brake friction surface of the rotor in Patent Document 1, for example.

Furthermore, for example, in relation to an existing electromagnetic clutch with a brake wherein a rolling bearing is assembled between a drive shaft and a driven shaft, if the outer periphery of the drive shaft does not have a structure wherein a partial load acts like in the case of a pulley or the like, the relevant part may be replaced by a slide bearing and the brake means in the present invention may be introduced between a stationary-side member and a rotating-side member, whereby it is possible to omit the rolling bearing which accounts for a high proportion of the product price and to effectively realize a reduction in cost.

The other configurations than the above-mentioned can also be modified variously within the scope of the present invention.

INDUSTRIAL APPLICABILITY

According to the present invention as described in detail above, it is possible to provide an electromagnetic clutch with a brake which, in addition to simply braking a rotor, is able to accurately prevent co-rotation of a driven shaft after disengagement of the electromagnetic clutch, thereby effectively improving response upon activation of the brake, is able to speedily stop a load connected to the driven shaft in response to stop of electric power supply, and is therefore excellent in stopping performance.

The invention claimed is:

1. An electromagnetic clutch, comprising:
    a rotatable member including,
    a first member rotatable around an axis, and
    a rotor rotatable together with the first member, the rotor including a clutch friction surface and a brake friction surface;
    a second member disposed coaxially and slidably around an outer periphery of the first member, wherein the second member drives the rotatable member to rotate around the axis;
    an armature fixed to the second member so as to be displaceable in a direction of the axis, the armature facing the rotor;
    a coil that presses the armature against the clutch friction surface of the rotor when the coil is supplied with electricity, and that releases the armature from the clutch friction surface of the rotor when the coil is not supplied with electricity;
    a brake device that continuously applies a brake torque to the rotatable member, the brake device including i) a coil spring with a base end of the coil spring supported on a stationary member side either directly or through a support member, and ii) a brake element positioned on a tip end side of the coil spring, the brake element being put in elastic contact with the brake friction surface of the rotor in an axial direction of the second member; and
    a restriction mechanism provided between a part of the brake element and an extension part of the stationary member side extending in the axial direction, the restriction mechanism configured to permit relative displacements in the axial direction but restrain relative displacements in the rotating direction, of the part of the brake element,
    wherein the brake torque applied by the brake device is not less than a slip torque generated between the second member and the first member and less than a driving torque applied by the second member.

2. The electromagnetic clutch according to claim 1, further comprising:
    a magnetic circuit forming member disposed outside of the coil, and that forms a magnetic circuit passing through the rotor and the armature,
    wherein the rotor partly covers an outer periphery of the magnetic circuit forming member.

3. The electromagnetic clutch according to claim 2, wherein the brake element is a tip end of the elastic element itself or a brake material attached to the tip end of the elastic element.

4. The electromagnetic clutch according to claim 3, wherein the brake element is made of a nonmagnetic material and is not a part of the magnetic circuit.

5. The electromagnetic clutch according to claim 2, wherein the armature and at least a part of the rotor are made of a magnetic material, and form the magnetic circuit with the magnetic circuit forming member.

6. The electromagnetic clutch according to claim 1, wherein the brake device applies the brake torque directly to the rotor.

7. An electromagnetic clutch, comprising:
    a rotatable member including,
    a first member rotatable around an axis, and
    a rotor rotatable together with the first member, the rotor including a clutch friction surface and a brake friction surface;
    a second member disposed coaxially and slidably around an outer periphery of the first member, wherein the second member drives the rotatable member to rotate around the axis;
    an armature fixed to the second member so as to be displaceable in a direction of the axis, the armature facing the rotor;
    means for pressing the armature against the clutch friction surface of the rotor and for releasing the armature from the clutch friction surface of the rotor; and
    a brake device that continuously applies a brake torque to the rotatable member, the brake device including i) a coil spring with a base end of the coil spring supported on a stationary member side either directly or through a support member, and ii) a brake element positioned on a tip end side of the coil spring, the brake element being put in elastic contact with the brake friction surface of the rotor in an axial direction of the second member; and
    a restriction means provided between a part of the brake element and an extension part of the stationary member side extending in the axial direction, the restriction means permitting relative displacements in the axial direction but restraining relative displacements in the rotating direction, of the part of the brake element,
    wherein the brake torque applied by the means for braking is not less than a slip torque generated between the second member and the first member and less than a driving torque applied by the second member.

* * * * *